March 6, 1945.   N. R. MARTO   2,370,807
INDUSTRIAL GOGGLES
Filed Jan. 2, 1943
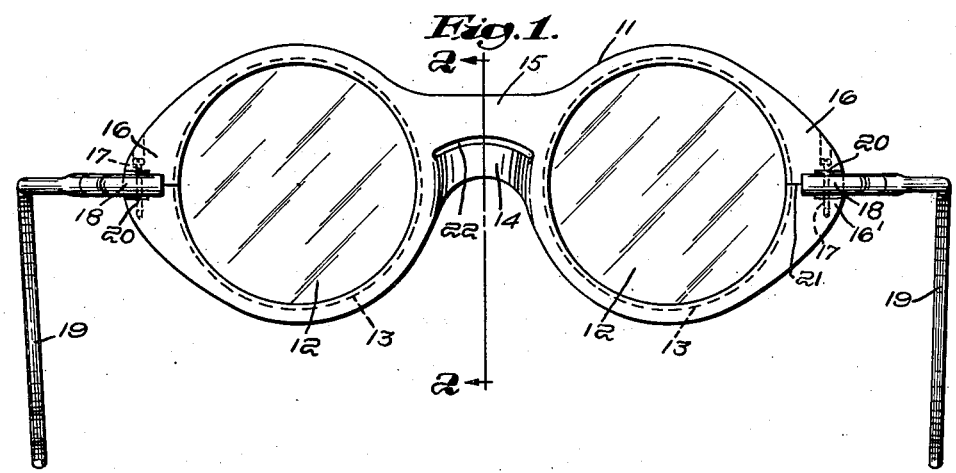
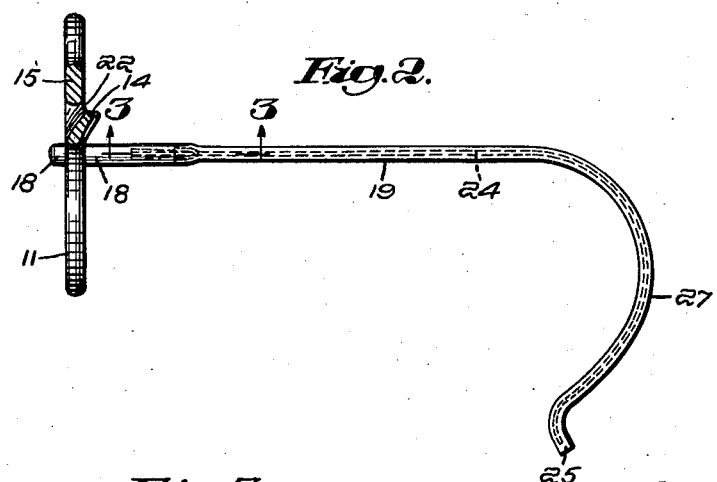
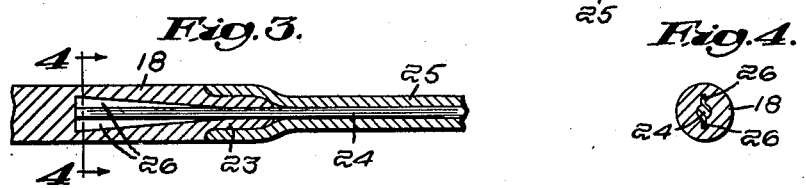
Inventor:
Nicholas R. Marto,
by Thomson & Thomson
Attorneys Patented Mar. 6, 1945

2,370,807

UNITED STATES PATENT OFFICE 2,370,807

INDUSTRIAL GOGGLES

Nicholas R. Marto, Roslindale, Mass., assignor, by mesne assignments, to Marine Optical Mfg. Co., Boston, Mass., a partnership composed of Arthur Ditto, Hugo M. Ditto, and Eugene D. Ditto Application January 2, 1943, Serial No. 471,203

1 Claim. (Cl. 88—52)

This invention relates to improvements in spectacles and pertains more particularly to industrial goggles equipped with either plain or optical lenses and used primarily to protect the eyes of the worker from dust, metal fragments or sparks which might otherwise cause serious injury.

In order to afford adequate protection, industrial goggles should be provided with temple bows which are so shaped that the curved ends of the bows are yieldingly engaged behind the ears of the wearer to prevent accidental displacement, while affording sufficient flexibility to ensure comfort and permit easy application and removal of the goggles.

The primary object of the invention is to provide an improved temple bow, comprising a plastic end piece which may be suitably hinged to the frame; a piece of plain, flexible wire anchored at one end within said end piece and curved at its opposite end to hook behind the ear; and a tubular sheath of soft plastic material, slid over the wire and removably secured at its forward end over a locking protuberance at the rear of said plastic end piece, to afford a covering for the wire and ensure comfort to the wearer. The use of such a temple bow avoids the necessity of providing the customary cable type bow which is expensive to make, requires an unnecessary amount of metal and must be soldered in a separate operation to a straight piece of wire which constitutes the forward part of the temple.

A recommended embodiment of the invention is shown in the accompanying drawing, in which:

Fig. 1 is a front elevation of the improved industrial goggle;

Fig. 2 is a sectional view on line 2—2 of Fig. 1;

Fig. 3 is an enlarged fragmentary sectional view of one of the temple bows, taken on line 3—3 of Fig. 2;

Fig. 4 is a section taken on line 4—4 of Fig. 3; and

Fig. 5 is a fragmentary plan view of the central portion of the spectacle frame as shown in Fig. 1.

The frame 11 of the improved goggles is preferably made of plastic material, such as cellulose acetate, and comprises a pair of cut-away eye pieces receiving lenses 12, the peripheries of which are engaged in grooves or channels 13; a nose bridge 14; a protective and reinforcing shield 15 spaced above and adjacent the bridge 14; and separable side portions 16 and 16' at each end thereof. The lenses 12 may, as aforesaid, be made of plain glass, colored if desired, as is usually the case for industrial use, or of optical glass for industrial and other purposes. These lenses are held in place by securing the side portions of the frame in closed position by means of a screw or other fastening, and in accordance with this invention, the screw 17 used for this purpose also serves as a pivot pin for the end piece 18 of the temple bow 19. The end piece 18 is elbow-shaped and swings in a cut-away notch 20 disposed at the joint between the respective portions 16 and 16' of the separable frame.

It will be observed that the head of the screw 17 is located in a counter sunk recess in the part 16, and it will be understood that the screw passes through a pivot opening in the elbow-like end piece 18 of the temple bow, before it threads into the complemental part 16' to close the joint at 21.

As best shown in Figs. 2 and 5, the nose bridge 14 is inclined or offset rearwardly of the plane of the lens frame and of the shield member 15, and said shield is relatively wide and separated from the bridge by a relatively narrow slot 22. The offsetting of the nose bridge 14 ensures that the flat lenses 12 are adequately spaced from the eye lids of the wearer; the relatively wide protective shield 15 reinforces the frame and guards against the entrance of flying particles above the bridge; and the narrow slot 22 permits the nose bridge to be properly shaped by suitable forming dies without leaving a wide opening for the admission of such particles between these frame parts.

The improved temple bows 19 which constitute the subject matter of this invention each comprises the elbow shaped end piece 18, preferably made of plastic material and having a reduced, bulbous protuberance or tip 23 (Fig. 3) at its rearward end; a piece of fine, flexible wire, such as piano wire 24; and a tubular covering sheath 25, preferably made of soft and freely flexible plastic, such as polyvinyl butyral, which may readily be slipped over the wire in assembling the parts. The forward end of the wire 24 is inserted in an axial orifice of the end piece 18 and anchored therein, preferably by forming the end of the wire with tapering fins 26 which lock in the plastic member 18 and prevent rotation or displacement of the wire relative thereto. The forward end of the plastic sheath 25 is forced over the bulbous tip 23 of the end piece 18, thereby frictionally and removably to secure the sheath in position without the necessity of using cement or other securing means. Because of the reduced size of the tip 23, the periphery of the sheath end registers with that of the body of the end piece 18.

The rearward end of the wire 24 is curved downwardly at 27 as shown in Fig. 2, to hook behind the ear of the wearer and thus hold the goggles in useful position against casual displacement when the head is bent downwardly or moved in other directions, or when the spectacle frame is accidentally subjected to shock or impact. The soft plastic sheath 25 conceals and protects the wire and also ensures that the temple bows will not cause discomfort to the wearer.

I am aware that temple bows made of plastic covered wire have heretofore been provided, but such bows have invariably been made by placing two grooved half sections of molded plastic together, over the wire, and cementing the abutting edges of the two sections together. When such temples are formed with curved ear hooks, the wire of the curved portion has been made of expensive cable or coiled wire to afford the necessary flexibility; and such temple bows are relatively difficult and expensive to manufacture as compared with the simple operations necessary in making the improved bows herein described, and it is aparent that the plastic covering thereof cannot be easily removed and replaced, as in the improved goggles, if it should become damaged.

I claim:

A temple bow of the character described, comprising an orificed end piece formed with a reduced, bulbous tip, a piece of plain, flexible wire, one end of which is received and anchored in the orifice of said end piece and the other end of which is curved to hook behind the ear of the wearer, and a removable, tubular sheath of polyvinyl butyral covering said wire and having one end expanded and frictionally engaged over the tip of said end piece, said sheath having a continuous and imperforate surface from end to end.

NICHOLAS R. MARTO.